United States Patent
Yang et al.

(10) Patent No.: US 11,263,301 B2
(45) Date of Patent: Mar. 1, 2022

(54) USER AUTHENTICATION USING VARIANT ILLUMINATION

(71) Applicant: Lenovo (Singapore) Pte. Ltd., Singapore (SG)

(72) Inventors: Zhenyu Yang, Dayton, OH (US); Jianbang Zhang, Cary, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 91 days.

(21) Appl. No.: 16/146,063

(22) Filed: Sep. 28, 2018

(65) Prior Publication Data
US 2020/0104471 A1    Apr. 2, 2020

(51) Int. Cl.
  *G06F 21/32*    (2013.01)
  *G06K 9/00*    (2022.01)
  *G06F 9/54*    (2006.01)
  *H04M 1/22*    (2006.01)

(52) U.S. Cl.
  CPC .............. *G06F 21/32* (2013.01); *G06F 9/541* (2013.01); *G06K 9/00288* (2013.01); *H04M 1/22* (2013.01)

(58) Field of Classification Search
  CPC ..... G06F 21/32; G06F 9/541; G06K 9/00288; H04M 1/22; H04L 9/3231
  See application file for complete search history.

(56) References Cited

U.S. PATENT DOCUMENTS

| | | | |
|---|---|---|---|
| 2010/0246904 A1* | 9/2010 | Yamashita | G06K 9/00255 382/118 |
| 2011/0175925 A1* | 7/2011 | Kane | H04N 21/42202 345/589 |
| 2012/0235790 A1* | 9/2012 | Zhao | G06K 9/00288 340/5.83 |
| 2013/0201653 A1* | 8/2013 | Shoemake | G06F 1/1626 362/3 |
| 2013/0296673 A1* | 11/2013 | Thaveeprungsriporn | A61B 5/6843 600/324 |
| 2016/0004000 A1* | 1/2016 | Huang | G02B 6/0028 362/608 |

(Continued)

OTHER PUBLICATIONS

Zhou Lijian et al., "A Robust Face Recognition Approach against Variant Illumination," IEEE, Jul. 25-27, 2012, pp. 3891-3896. (Year: 2012).*

(Continued)

*Primary Examiner* — Luu T Pham
*Assistant Examiner* — Canh Le
(74) *Attorney, Agent, or Firm* — Ference & Associates LLC

(57) ABSTRACT

One embodiment provides a method, including: providing, using a light source operatively coupled to an information handling device, illumination on an object; capturing, using a sensor operatively coupled to the information handling device, illumination reflectance from the object; determining, using a processor and based on the illumination reflectance, whether the object is associated with a human user and whether the human user is an authorized user; and authenticating, responsive to determining that the object is associated with the human user and that the human user is an authorized user, the human user. Other aspects are described and claimed.

12 Claims, 4 Drawing Sheets

(56) References Cited

U.S. PATENT DOCUMENTS

| | | | | |
|---|---|---|---|---|
| 2016/0071111 A1* | 3/2016 | Wang | ................. | G06Q 30/0643 |
| | | | | 705/44 |
| 2016/0300108 A1* | 10/2016 | Willis | ................. | G06K 9/0061 |
| 2017/0146890 A1* | 5/2017 | Shoemake | ............ | H02J 7/0042 |
| 2017/0188438 A1* | 6/2017 | Vollmer | ................. | H05B 47/18 |
| 2018/0120553 A1* | 5/2018 | Leshem | ................. | G01N 21/17 |
| 2018/0218371 A1* | 8/2018 | Wang | ................. | G06Q 20/4014 |
| 2019/0102608 A1* | 4/2019 | Wang | ................. | G06K 9/00906 |

OTHER PUBLICATIONS

Zisheng Li et al." Robust Face Recognition Using Block-based Bag of Words," IEEE computer society, 2010, pp. 1285-1288 (Year: 2010).*

* cited by examiner

USER AUTHENTICATION USING VARIANT ILLUMINATION

BACKGROUND

Information handling devices ("devices"), for example smart phones, tablet devices, smart speakers, laptop and personal computers, and the like, may have measures in place to authenticate a user prior to granting that user access to content on the device (e.g., access to a user profile, access to an application, etc.). For example, authentication mechanisms may include password authentication (e.g., provided via keyboard input, touch input, audible input, etc.), fingerprint identification, voice authentication, face authentication, and the like. Responsive to authenticating a user, a device may thereafter grant the user access to the requested content.

BRIEF SUMMARY

In summary, one aspect provides a method, comprising: providing, using a light source operatively coupled to an information handling device, illumination on an object; capturing, using a sensor operatively coupled to the information handling device, illumination reflectance from the object; determining, using a processor and based on the illumination reflectance, whether the object is associated with a human user and whether the human user is an authorized user; and authenticating, responsive to determining that the object is associated with the human user and that the human user is an authorized user, the human user.

Another aspect provides an information handling device, comprising: a light source; a sensor; a processor; a memory device that stores instructions executable by the processor to: provide illumination on an object; capture illumination reflectance from the object; determine whether the object is associated with a human user and whether the human user is an authorized user; and authenticate the user responsive to determining that the object is associated with the human user and that the human user is an authorized human user.

A further aspect provides a product, comprising: a storage device that stores code, the code being executable by a processor and comprising: code that provides illumination on a object; code that captures illumination reflectance from the object; code that determines whether the object is associated with a human user and whether the human user is an authorized user; and code that authenticates the user responsive to determining that the object is associated with the human user and that the human user is an authorized user.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
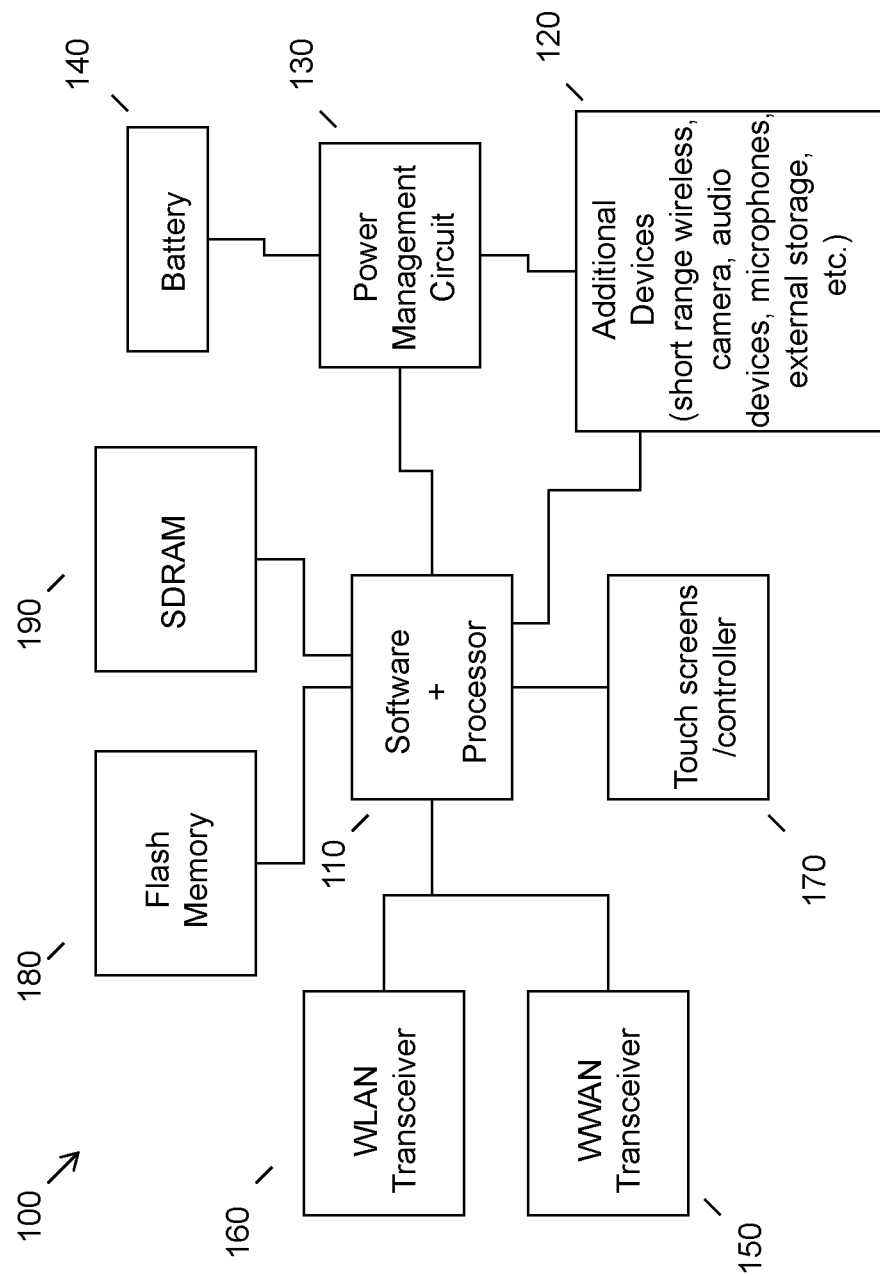
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As facial recognition technologies advance, face recognition is becoming an important method for user authentication in addition to password input, fingerprint input, iris input, and the like. Although these technologies are becoming more mature and robust, conventional methods for performing face authentication tend to be easily spoofed, thereby leading to a greater security risk. For example, a bad actor may place a printed photo of an authorized user in front of a camera of the device in an attempt to trick the device to unlock or to grant them access to a particular application. Bad actors may also use pre-recorded videos of an authorized user and/or 3D masks of the authorized user to attempt to spoof the system.

Although methods exist to combat spoofing, each of these conventional methods comprises certain issues. For example, conventional technologies may be able to analyze the features of an image to see if the image is a printed copy or human skin. However, this method does not work well on high resolution images. As another example, blink detection may also be utilized; however, this method may be faked by software to replace the eye ball of an image with blinking eyes. As another example still, 3D depth information may be leveraged to attempt to differentiate between a 2D image and a real-life individual. However, capturing 3D depth information may require additional and potentially expensive hardware (e.g., a light-field camera, near-infrared sensor, 3D scanner, a combination thereof, etc.). Furthermore, in addition to cost, any additional hardware must be integrated with the face recognition system, which complicates the system design and may take additional time to implement and maintain.

Accordingly, an embodiment provides a method for authenticating a user via variant illumination. More particularly, an embodiment may leverage the concept that different surface features of objects and different surface materials react to lighting condition changes in different ways. More specifically, light reflected from printed photos, displayed photos, videos, 3D masks, and the like may differ from how light is reflected off of the human skin. Additionally, different types of light (e.g., different colors of light, different brightness levels of light, etc.) may reflect off objects differently than other types of light. Embodiments of the underlying application may take advantage of a device's existing display screen and front camera without requiring additional hardware components and at a minimal computational cost In an embodiment, illumination may be provided on an object (e.g., a face of a user, etc.) via a light source (e.g., light emitted from a display screen, a light emission sensor, etc.). An embodiment may emit a single illumination set or two or more illumination sets. In the two or more illumination sets, an illumination condition is different between the sets (e.g., one illumination set emits blue illumination whereas another illumination set emits red illumination, etc.). An embodiment may then capture the illumination reflectance from the object and determine whether the captured illumination reflectance corresponds to an authorized user. Responsive to determining that the illumination reflectance does correspond to an authorized user, an embodiment may then authenticate the user. Such a method of user authentication provides greater security to a device while costing less than conventional methods and/or devices.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes one or more touch screens 170 for data input and display/rendering. System 100 also typically includes various memory devices, for example flash memory 180 and SDRAM 190.

Figure 2:
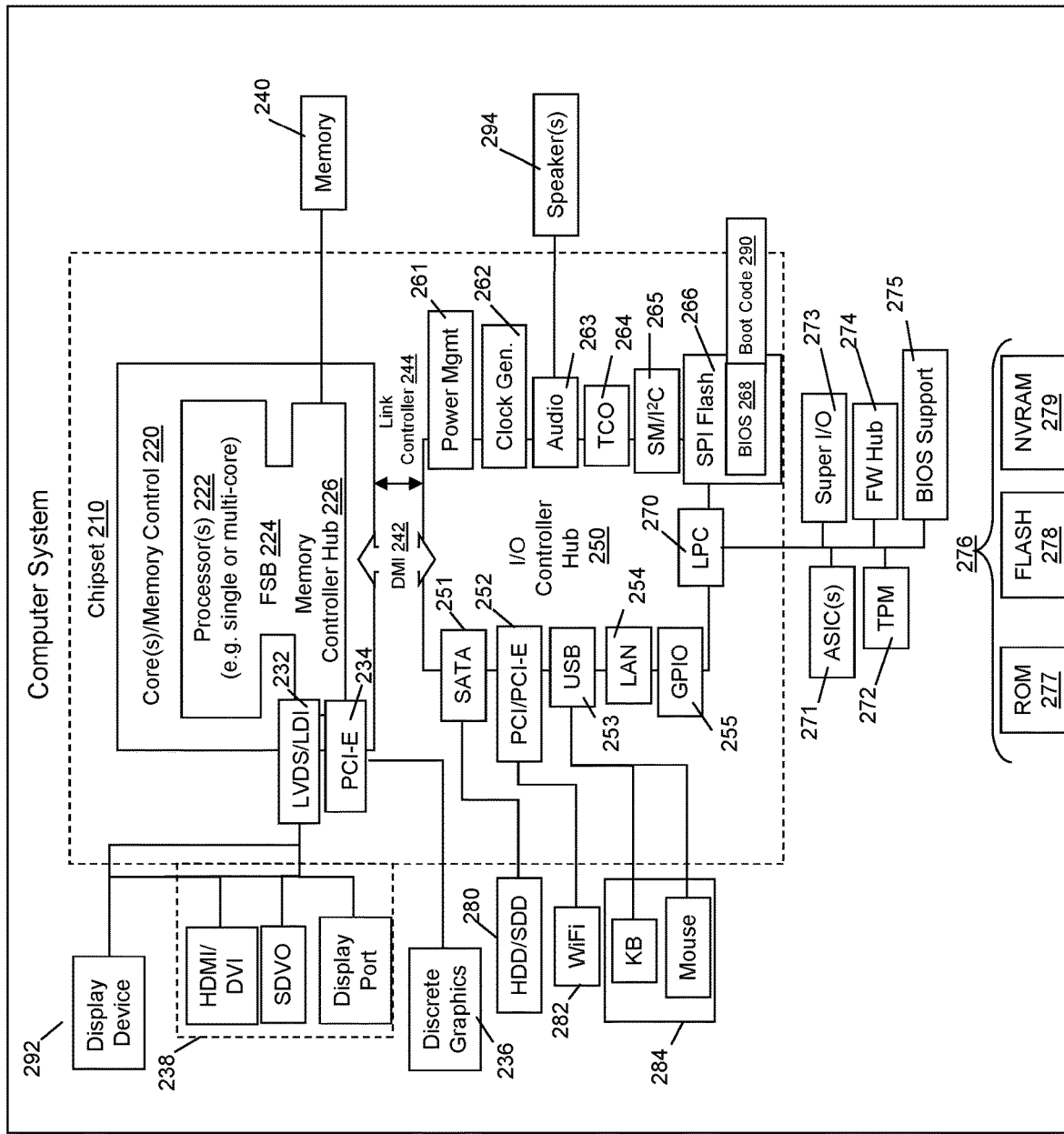
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, smart speakers, smart appliances, personal computer devices generally, and/or electronic devices that are capable of emitting illumination and thereafter capturing illumination reflectance. For example, the circuitry outlined in FIG. 1 may be implemented in a tablet or smart phone embodiment, whereas the circuitry outlined in FIG. 2 may be implemented in a laptop embodiment.

Figure 3:
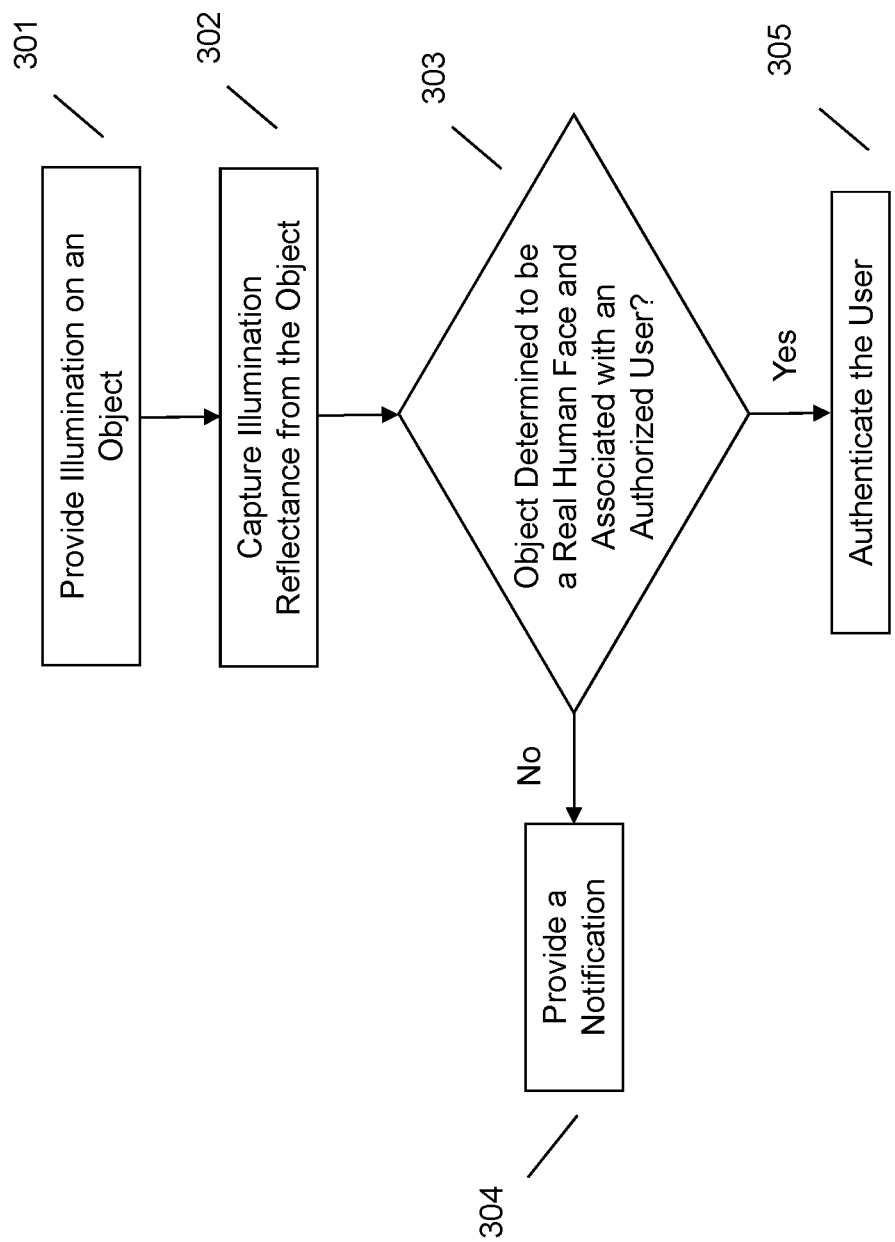
FIG. 3 illustrates an example method of authenticating a user using variant illumination.

Referring now to FIG. 3, an embodiment may authenticate a user via variant illumination. At 301, an embodiment may provide illumination on an object (e.g., a face of a human user, etc.) using a light source integrally or operatively coupled to the device. In an embodiment, the light source may be light emitted from a display screen of the device, light emitted from a light emitting sensor, a combination thereof, and the like. In an embodiment, the illumination may be provided automatically responsive to detecting a particular use-based factor such as a user picking up the device, a user requesting to access particular content on the device (e.g., access a user profile, access password protected content, access financial content, etc.), and the like. Alternatively, an embodiment may not take any explicit steps to provide illumination but rather may benefit from the natural illumination provided by the display screen of a device.

In an embodiment, the provision of illumination may comprise the provision of a single illumination set or two or more illumination sets. In the context of this application an illumination set may correspond to an instance at which illumination is provided by the device onto an object. The provision of two or more illumination sets may correspond to two or more instances where illumination is emitted by the device within a predetermined, short period of time (e.g., under 0.5 seconds, 1 second, etc.). In an embodiment, with respect to the provision of multiple illumination sets each illumination set may be provided with a different illumination condition (e.g., color type, brightness strength, etc.). For example, a first illumination set may be provided using a substantially blue color whereas a second illumination set may be provided using a substantially yellow color. As another example, a first illumination set may be provided at a substantially lower brightness level than another illumination set.

Figure 4:
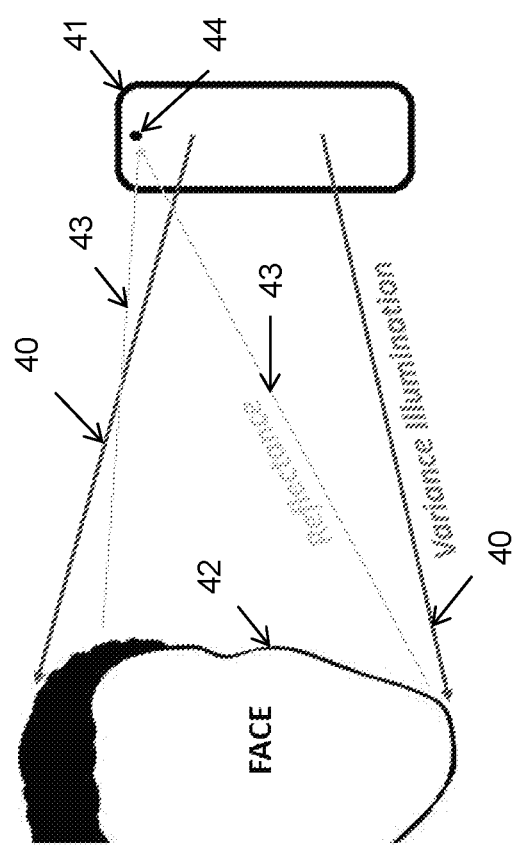
FIG. 4 illustrates an example method of emitting illumination and capturing an illumination reflectance.

At 302, an embodiment may capture the illumination reflectance from the object using a sensor integrally or operatively coupled to the device. In the context of this application an illumination reflectance may refer to an image captured by the device that comprises reflectance data for an illumination set. More particularly and with reference to FIG. 4, illumination 40 may first be provided by the device 41 (e.g., a smart phone, etc.) toward an object 42 (i.e., a human face). The device 41 may thereafter capture an illumination reflectance image 43 at a sensor 44. The illumination reflectance image 43 may then be analyzed to identify characteristics associated with the reflectance (i.e., how light from the illumination set reflected off of the object reacts).

At 303, an embodiment may determine whether the illumination reflectance corresponds to a human user and whether the human user is an authorized user. With respect to the capture of a single illumination reflectance image, an embodiment may compare the characteristics of the illumination reflectance image to those of a known illumination reflectance image associated with an authorized user, which is stored in an accessible storage location (e.g., stored locally on the device, remotely on another device, in another storage location, etc.). For example, if blue light was projected on a user's face then an embodiment may compare the received reflectance values/characteristics for the blue light reflectance image to the reflectance value/characteristics of a blue light reflectance image known to be associated with an authorized user. If a match is identified (e.g., if similarities between the two reflectance images exceed a predetermined threshold percentage of similarity, etc.) then an embodiment may identify the user as an authorized user. If, however, the same blue light was projected onto a non-human object (e.g., a picture of an authorized user, etc.), an embodiment may identify that the received reflectance value/characteristics from the reflectance image of the non-human object are more closely associated with printed paper than human skin (e.g., by accessing known reflectance values for printed paper and comparing those values to the received reflectance image, etc.). In such a scenario, an embodiment may not activate an application or perform a requested function. Additionally, if an unauthorized human user attempts to access a device, although an embodiment may identify that the reflectance values from the unauthorized user are associated with a human, the reflectance values from the unauthorized user would nevertheless be different from the reflectance values of the authorized user because of the different facial features between the users that would affect reflectance characteristics.

With respect to the capture of two or more illumination reflectance images, an embodiment may capture two or more reflectance images within a short period of time where each of the reflectance images has an illumination condition that is different than the other reflectance images. Responsive to receiving all of the reflectance images, an embodiment may compare the images against each other to identify similarities and differences between the images. More particularly, some spoofing objects (i.e., printed pictures, videos, 3D masks, etc.) may produce a similar reflectance image as a human face does under certain illumination conditions. By emitting two or more illumination sets with different illumination conditions, an embodiment may be able to better differentiate between a spoofing object and a real human face. Responsive to determining that the object corresponds to a human face instead of a non-human object, an embodiment may thereafter conduct conventional facial feature detection on the human user to identify if the human user is associated with an authorized user.

Responsive to determining, at 303, that the illumination reflectance does not correspond to an authorized user, an embodiment may, at 304, notify the user that they have not been identified as an authorized user. If a user has requested to access content, the user may be denied access to that content. Conversely, responsive to determining, at 303, that the illumination reflectance corresponds to an authorized user, an embodiment may, at 305, identify the user as an authenticated user and thereafter grant that user access to requested content.

In an embodiment, one or more sensors may detect a level of ambient light in a user's area and determine whether or not to affect an illumination characteristic based on the level of ambient light detected. More particularly, if a level of ambient light exceeds a predetermined threshold level, an embodiment may increase the brightness of the light source by a predetermined factor in order to compensate for the bright ambient light. For example, if a system attempts to authenticate a user in a bright environment (e.g., outdoors on a sunny day, etc.), then the bright ambient light may negatively affect the authentication processes. Accordingly, an embodiment may increase the brightness of a light source so that certain illumination conditions (e.g., the color of the illumination, etc.) are capable of being appropriately reflected and captured by the device. Alternatively, an embodiment may notify the user that the ambient light may be negatively affecting the authentication processes and request the user to relocate to a darker environment.

The various embodiments described herein thus represent a technical improvement to conventional user authentication techniques. Using the techniques described herein, an embodiment may provide illumination on an object (i.e., a human face) using a light source. An embodiment may then capture the illumination reflectance from the object and determine whether the illumination reflectance corresponds to a human, authorized user. Responsive to determining that the captured illumination reflectance does correspond to an authorized user, an embodiment may authenticate a user. Such a method may strengthen the security of a device and more capably ensure that only authorized users access the device or contents on the device.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:

identifying a level of ambient light in an area associated with an information handling device;

determining whether the level of ambient light in the area exceeds a predetermined threshold level;

notifying, responsive to determining that the level of ambient light in the area exceeds the predetermined threshold level, a user of the information handling device that a user authentication process cannot be initiated and instructing the user to relocate to another location at which the level of ambient light does not exceed the predetermined threshold level;

initiating, responsive to determining that the level of ambient light in the area does not exceed the predetermined threshold level, a user authentication process, wherein the user authentication process comprises:

providing, using light emitted from a display screen integrally coupled to the information handling device, illumination on an object, wherein the illumination is visible light and is provided at a specific color, wherein the providing the illumination comprises providing the illumination using at least two variant illumination sets and wherein the specific color associated with each set from the at least two variant illumination sets is unique;

capturing, using a sensor operatively coupled to the information handling device, illumination reflectance from the object, wherein the illumination reflectance comprises behavioral characteristics of how the visible light reflects off of the object and wherein the capturing comprises capturing the illumination reflectance from each of the at least two variant illumination sets;

determining, using a processor and based on the illumination reflectance from each of the at least two variant illumination sets, whether the object is associated with a human user and whether the human user is an authorized user, wherein the determining comprises:

accessing a data store of known behavioral characteristics for the illumination reflectance of the illumination for each specific color reflecting from a human; and determining, via comparing the captured behavioral characteristics for the illumination reflectance for each set in the at least two variant illumination sets against each other and with reference to the data store of known behavioral characteristics, whether the object is associated with the human user; and authenticating, responsive to determining that the object is associated with the human user and that the human user is an authorized user, the human user.

2. The method of claim 1, wherein the illumination condition is at least one condition selected from the group consisting of illumination color and illumination brightness.

3. The method of claim 1, further comprising performing, responsive to determining that the object is associated with a human user, facial feature identification to determine whether the human user is the authorized user.

4. The method of claim 1, wherein the determining comprises comparing the captured illumination reflectance to a database comprising a known illumination reflectance of the authorized user.

5. The method of claim 1, further comprising granting the authenticated user access to requested content.

6. The method of claim 1, further comprising identifying an ambient light level and, responsive to determining that the ambient light level is brighter than a predetermined threshold, increasing a brightness of the light source by a predetermined factor.

7. An information handling device, comprising:
a display screen;
a sensor;
a processor;
a memory device that stores instructions executable by the processor to:
identify a level of ambient light in an area associated with an information handling device;
determine whether the level of ambient light in the area exceeds a predetermined threshold level;
notify, responsive to determining that the level of ambient light in the area exceeds the predetermined threshold level, a user of the information handling device that a user authentication process cannot be initiated and instructing the user to relocate to another location at which the level of ambient light does not exceed the predetermined threshold level;
initiate, responsive to determining that the level of ambient light in the area does not exceed the predetermined threshold level, a user authentication process, wherein the instructions executable by the processor to initiate the user authentication process comprise instructions executable by the processor to:
provide illumination on an object using light emitted from the display screen, wherein the illumination is visible light and is provided at a specific color, wherein the providing the illumination comprises providing the illumination using at least two variant illumination sets and wherein the specific color associated with each set from the at least two variant illumination sets is unique;

capture illumination reflectance from the object, wherein the illumination reflectance comprises behavioral characteristics of how the visible light reflected off of the object and wherein the capturing comprises capturing the illumination reflectance from each of the at least two variant illumination sets;

determine, based on the illumination reflectance from each of the at least two variant illumination sets, whether the object is associated with a human user and whether the human user is an authorized user, wherein the instructions executable by the processor to determine comprise instructions executable by the processor to:

access a data store of known behavioral characteristics for the illumination reflectance of the illumination for each specific color reflecting from a human; and determine, via comparing the captured behavioral characteristics for the illumination reflectance for each set in the at least two variant illumination sets against each other and with reference to the data store of known behavioral characteristics, whether the object is associated with the human user; and authenticate the human user responsive to determining that the object is associated with the human user and that the human user is an authorized user.

8. The information handling device of claim 7, wherein the illumination condition is at least one condition selected from the group consisting of illumination color and illumination brightness.

9. The information handling device of claim 7, wherein the instructions are further executable by the processor to perform, responsive to determining that the object is associated with a human user, facial feature identification to determine whether the human user is an authorized user.

10. The information handling device of claim 7, wherein the instructions executable by the processor to determine comprise instructions executable by the processor to compare the captured illumination reflectance to a database comprising a known illumination reflectance of an authorized user.

11. The information handling device of claim 7, wherein the instructions are further executable by the processor to identify an ambient light level and, responsive to determining that the ambient light level is brighter than a predetermined threshold, increase a brightness of the light source by a predetermined factor.

12. A product, comprising:
a storage device that stores code, the code being executable by a processor and comprising:
code that identifies a level of ambient light in an area associated with an information handling device;
code that determines whether the level of ambient light in the area exceeds a predetermined threshold level;
code that notifies, responsive to determining that the level of ambient light in the area exceeds the predetermined threshold level, a user of the information handling device that a user authentication process cannot be initiated and code that instructs the user to relocate to another location at which the level of ambient light does not exceed the predetermined threshold level;

code that initiates, responsive to determining that the level of ambient light in the area does not exceed the predetermined threshold level, a user authentication process, wherein the code that initiates user authentication process comprises:
  code that provides illumination on a object using light emitted from a display screen, wherein the illumination is visible light and is provided at a specific color, wherein the providing the illumination comprises providing the illumination using at least two variant illumination sets and wherein the specific color associated with each set from the at least two variant illumination sets is unique;
  code that captures illumination reflectance from the object, wherein the illumination reflectance comprises behavioral characteristics of how the visible light reflected off of the object and wherein the capturing comprises capturing the illumination reflectance from each of the at least two variant illumination sets;
  code that determines, based on the illumination reflectance from each of the at least two variant illumination sets, whether the object is associated with a human user and whether the human user is an authorized user, wherein the code that determines comprises:
    code that accesses a data store of known behavioral characteristics for the illumination reflectance of the illumination for each specific color reflecting from a human; and
    code that determines, via comparing compares the known behavioral characteristics to the captured behavioral characteristics for the illumination reflectance for each set in the at least two variant illumination sets against each other and with reference to the data store of known behavioral characteristics, whether the object is associated with the human user; and
  code that authenticates the human user responsive to determining that the object is associated with the human user and that the human user is an authorized user.

* * * * *